United States Patent
Katsuyama et al.

(10) Patent No.: US 7,197,014 B2
(45) Date of Patent: Mar. 27, 2007

(54) RECORDING MEDIUM, FAULT ANALYSIS DEVICE AND FAULT ANALYSIS METHOD

(75) Inventors: Tsuneo Katsuyama, Kawasaki (JP); Masanobu Morinaga, Kawasaki (JP); Hideaki Miyazaki, Kawasaki (JP); Yuji Nomura, Kawasaki (JP); Takeshi Yasuie, Kawasaki (JP); Noriyuki Fukuyama, Kawasaki (JP); Masaaki Wakamoto, Kawasaki (JP); Satoshi Nojima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 36 days.

(21) Appl. No.: 11/019,547

(22) Filed: Dec. 23, 2004

(65) Prior Publication Data

US 2005/0289395 A1    Dec. 29, 2005

(30) Foreign Application Priority Data

Jun. 25, 2004    (JP)    ............................ 2004-188517

(51) Int. Cl.
*H04J 3/14*    (2006.01)
(52) U.S. Cl. ...................................... 370/252; 370/253
(58) Field of Classification Search ................ 370/216, 370/229, 235, 241, 242, 248, 252, 253, 255, 370/230, 232, 389
See application file for complete search history.

(56) References Cited

U.S. PATENT DOCUMENTS

| | | | | |
|---|---|---|---|---|
| 6,108,800 A | * | 8/2000 | Asawa | ........................ 714/47 |
| 2002/0174216 A1 | | 11/2002 | Shorey et al. | |
| 2002/0181494 A1 | | 12/2002 | Rhee | |

FOREIGN PATENT DOCUMENTS

| | | |
|---|---|---|
| JP | 4-31299 | 3/1992 |
| KR | 2003-67547 | 8/2003 |
| WO | WO 03/081873 | 10/2003 |

OTHER PUBLICATIONS

"Analysis of DNS Traffic at a DNS Server in an ISP", Akira Kato et al., Transactions of the Insitute of Electronics, Information and Communication Engineers, B, J87-B, No. 3, pp. 327-335, Mar. 2004.
European Search Report mailed Sep. 21, 2005 in corresponding European Application No. EP 05250022.
"TCP Vegas Revisited", U. Hengartner et al., IEEE INFOCOM 2000, vol. 3, Mar. 26, 2000, pp. 1546-1555.
"Modeling TCP Throughput: A Simple Model and its Empirical Validation", Jitendra Padhye et al., Computer Communication Review, Association for Computing Machinery, vol. 28, No. 4, Oct. 1998, pp. 303-314.

* cited by examiner

*Primary Examiner*—Brenda Pham
(74) *Attorney, Agent, or Firm*—Staas & Halsey LLP

(57) ABSTRACT

A computer-readable recording medium recording a program capable of accurately analyzing the cause of a performance fault at the very end point of a client system, server system, etc. Outgoing and incoming packets are captured during execution of a communication application to measure a round trip time, and a communication window size of the transmitting source is estimated based on the captured incoming packets. A throughput estimate is calculated from the round trip time and the communication window size, and the estimated value and actual measured value of the throughput are displayed on, for example, a display, together with various other communication parameters including the communication window size and the round trip time, whereby the cause of a performance fault can be accurately located by quantitative analysis.

8 Claims, 9 Drawing Sheets

RECORDING MEDIUM, FAULT ANALYSIS DEVICE AND FAULT ANALYSIS METHOD

CROSS-REFERENCE TO RELATED APPLICATIONS

This application is based on, and claims priority to, Japanese Application No. 2004-188517, filed Jun. 25, 2004, in Japan, and which is incorporated herein by reference.

BACKGROUND OF THE INVENTION

1. Field of the Invention

The present invention relates to a computer-readable recording medium, fault analysis device and fault analysis method. More particularly, the invention relates to a computer-readable recording medium recording program for analyzing the cause of a fault in performance occurring on a network, fault analysis device and fault analysis method.

2. Description of the Related Art

As IP (Internet Protocol)-based networks have come to be used as a social infrastructure, there has been a need for techniques capable of promptly and appropriately coping with not only a functional fault such as communication inability but a fault in performance such as slow response time.

To monitor a fault occurring on a network, a method using SNMP (Simple Network Management Protocol), which is a representative network management protocol associated with TCP (Transmission Control Protocol)/IP, has conventionally been adopted. According to SNMP, information called MIB (Management Information Base) and system messages generated and transmitted from the system are collected and analyzed. MIB holds traffic information such as the number of outgoing/incoming IP packets, as well as the count of lost packets, and based on such information, a fault of network equipment etc. is detected. Also, a system message includes a description of an anomaly status directly detected by equipment and thus is used for fault detection.

Conventional network management systems adopt a method wherein the collection and tracing of fault information indicated by MIB and system messages are centrally managed by a network monitoring terminal (SNMP manager) operated by a system administrator, for example. The paper "Analysis of DNS Traffic at a DNS Server in an ISP" by Kato and Sekiya, in the Transactions of the Institute of Electronics, Information and Communication Engineers, B, J87-B, No. 3, pp. 327–335, March 2004, deals with the technique of collecting and analyzing the traffic information of a DNS (Domain Name System) server in a commercial ISP (Internet Service Provider).

However, information to be collected is more and more expanding due to enlargement in the scale of networks and diversification/functional sophistication of network equipment, giving rise to a problem that because of the size of information, it is hardly possible to centrally manage detailed information such as records of individual outgoing and incoming packets. For example, the above paper reports that in the case of a commercial ISP, packet information collected by a DNS server is as much as 0.7 GB/hour. Also, it is difficult in particular to sort out and appropriately analyze relevant information from among a vast amount of collected information. Thus, there is a limit to the analysis of performance faults by the centralized management method.

As an example of non-centralized management, an analysis method has also been used in which a measurement-analysis device (Sniffer etc.) is introduced when a fault has occurred, to trace packets to a faulty spot. In cases where the network is functioning normally but the performance thereof involves a problem such as slow Web access or poor speech quality of IP telephones, it is essential to carry out detailed tracing of the transmission/reception time, status, etc. of individual packets by using the packet tracing function, in order to find the cause of such a fault. However, the conventional measurement-analysis device can collect only limited items of information such as loss rate, and where the throughput lowers due to a cause other than packet loss, it is difficult to find the cause. Moreover, since the actual analysis is performed by a person, he/she is required to have great skill in the analysis.

SUMMARY OF THE INVENTION

The present invention was created in view of the above circumstances, and an object thereof is to provide a computer-readable recording medium recording program whereby packets can be collected at the very end point of a client system, a server system, etc. to obtain detailed information and the cause of a performance fault can be accurately located based on quantitative analysis of the obtained information, and fault analysis device and fault analysis method.

To achieve the object, there is provided a computer-readable recording medium recording a program for causing a computer to perform a process of analyzing a cause of a performance fault occurring on a network. The recording medium causes the computer to function as a packet capture unit for capturing outgoing and incoming packets during execution of a communication application, a round trip time measurement unit for measuring a round trip time, a communication window size estimation unit for estimating a communication window size of a transmitting source based on the captured incoming packets, a throughput estimate calculation unit for calculating an estimated value of throughput based on the communication window size and the round trip time and a analysis result presentation unit for presenting the estimated value and actual measured value of the throughput, together with various communication parameters including the communication window size and the round trip time.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIGS. 5A and 5B exemplify window size control algorithms, wherein FIG. 5A shows the Tahoe algorithm and FIG. 5B shows the Reno/New-Reno algorithm.

FIGS. 8A and 8B exemplify the occurrence of RTO due to packet loss, wherein FIG. 8A illustrates the case where a retransmission packet is lost again and FIG. 8B illustrates the case where the last packet of data in a window size is lost.

DESCRIPTION OF THE PREFERRED EMBODIMENTS

Preferred embodiments of the present invention will be described below with reference to the accompanying drawings.

Figure 1:
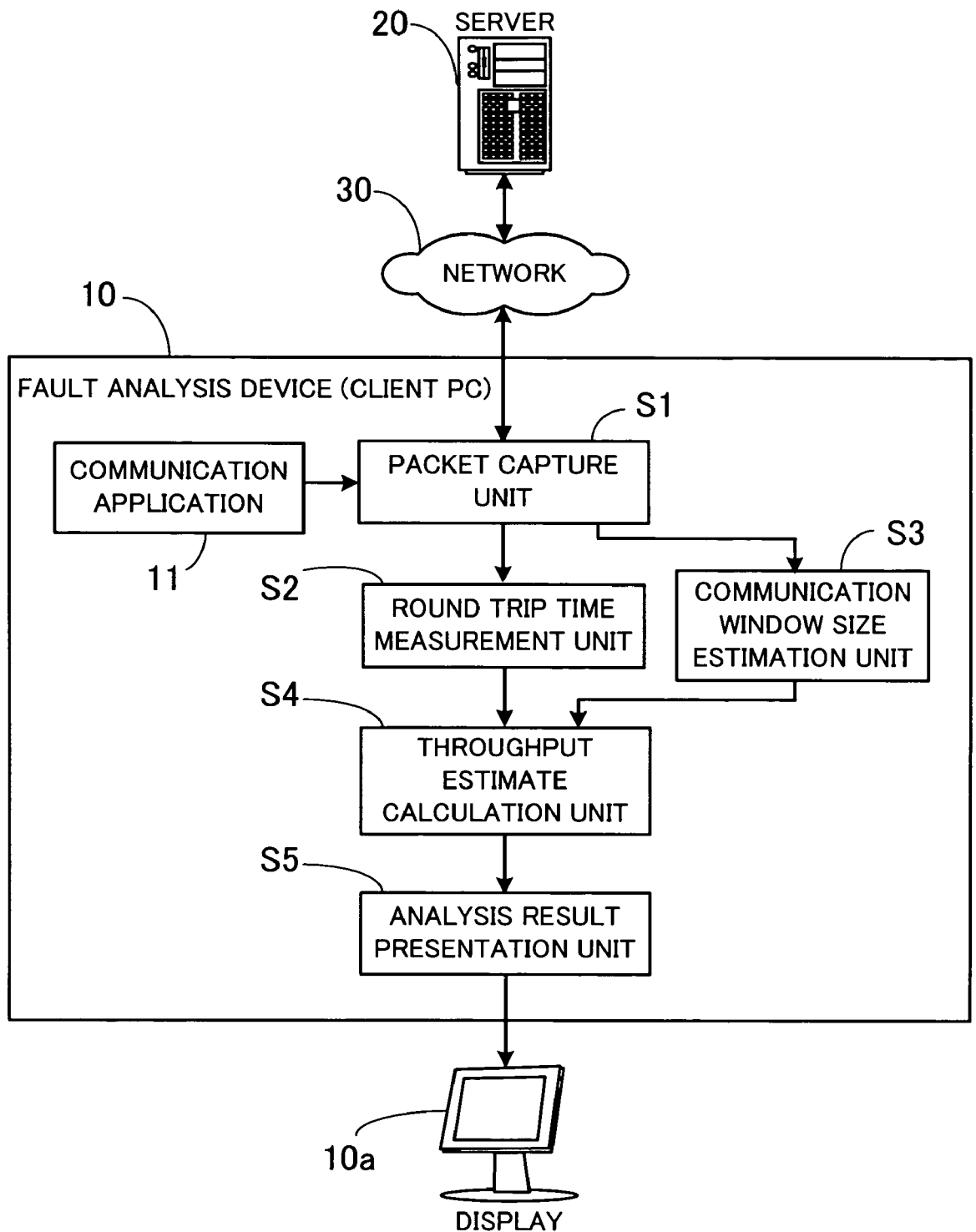
FIG. 1 illustrates the principle of a fault analysis device of the present invention.

FIG. 1 illustrates the principle of a fault analysis device according to the present invention.

The fault analysis device 10 is, for example, a client PC (Personal Computer) and comprises a packet capture unit S1, a round trip time measurement unit S2, a communication window size estimation unit S3, a throughput estimate calculation unit S4, and an analysis result presentation unit S5.

The packet capture unit S1 captures outgoing and incoming packets during execution of a communication application 11 such as FTP (File Transfer Protocol) software or Web. An incoming packet is a packet transmitted from a transmitting source (in the following, assumed to be a server 20) through a network 30.

The round trip time measurement unit S2 measures a round trip time (RTT).

The communication window size estimation unit S3 estimates a communication window size (hereinafter referred to merely as the "window size") of the server 20 based on the captured incoming packets.

Figure 2:
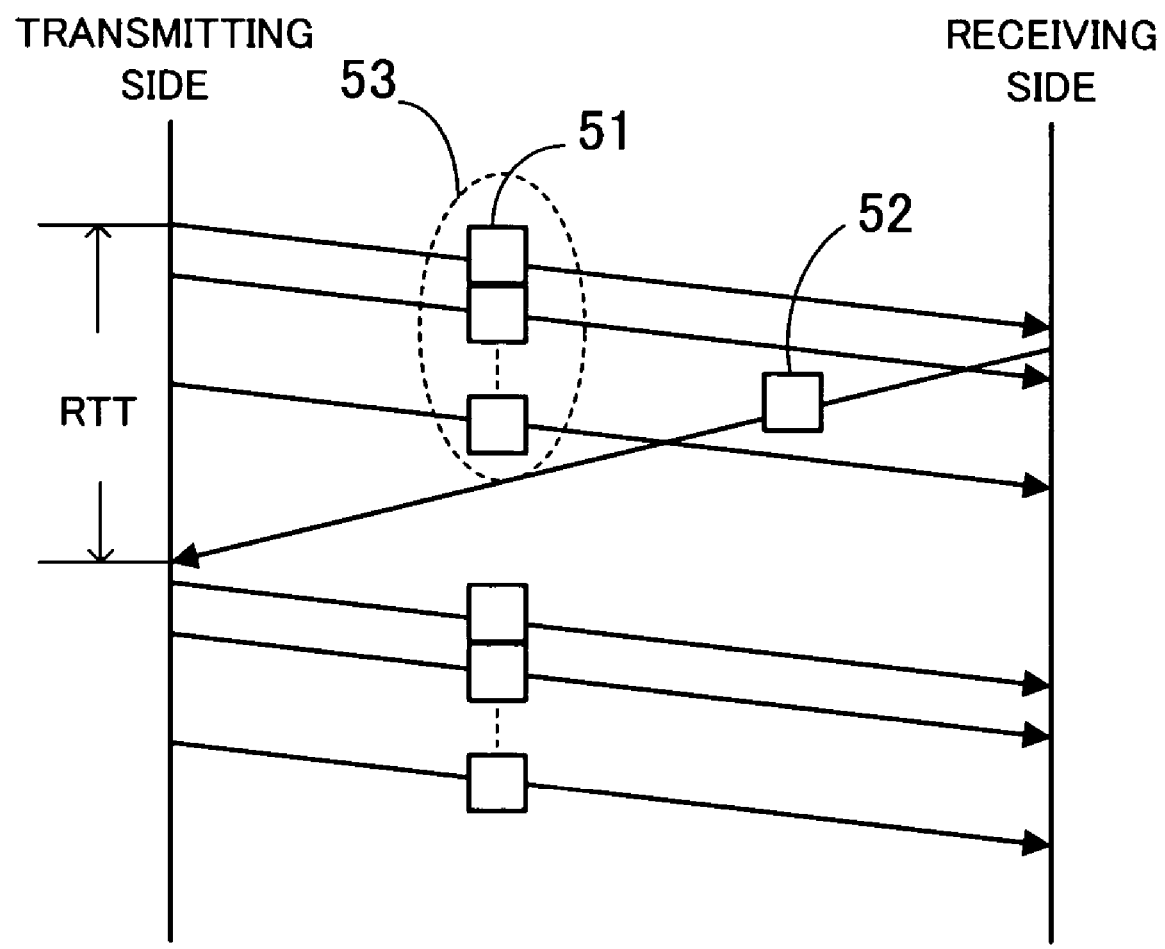
FIG. 2 illustrates transmission/reception of packets according to window control.

FIG. 2 illustrates transmission/reception of packets according to window control.

According to the window control, a plurality of packets 51 are transmitted from the transmitting side one after another (e.g., at intervals of 1 msec or less). The size of a packet group 53 that can be transmitted before the reception of an acknowledgment packet 52 is called a window size. The acknowledgment packet 52 serves to notify the transmitting side of the reception of the packet 51 by the receiving side, and the RTT (e.g., 10 msec or more) is required until the acknowledgment packet reaches the transmitting side.

The window size of the fault analysis device 10 can be acquired from information in the TCP headers of outgoing packets, while the window size of the server 20 is estimated by the communication window size estimation unit S3 of the fault analysis device 10. The communication window size estimation unit S3 estimates the window size of the server 20 from the total data amount of incoming packets received from the server 20 over a cumulative arrival time equal to the RTT shown in FIG. 2, as described in detail later. Estimation of the window size performed in case of packet loss will be explained later.

The throughput estimate calculation unit S4 calculates an estimated value of throughput based on the window size and the RTT. The throughput is restricted by the smaller one of the window size of the fault analysis device 10 and the window size of the server 20 estimated by the communication window size estimation unit S3. Thus, using the smaller window size, an estimated value of the throughput is calculated according to the equation: Throughput estimate=window size/RTT. The throughput estimate calculation unit S4 also has the function of calculating the throughput estimate while compensating for the influence of packet loss, as described later.

Figure 3:
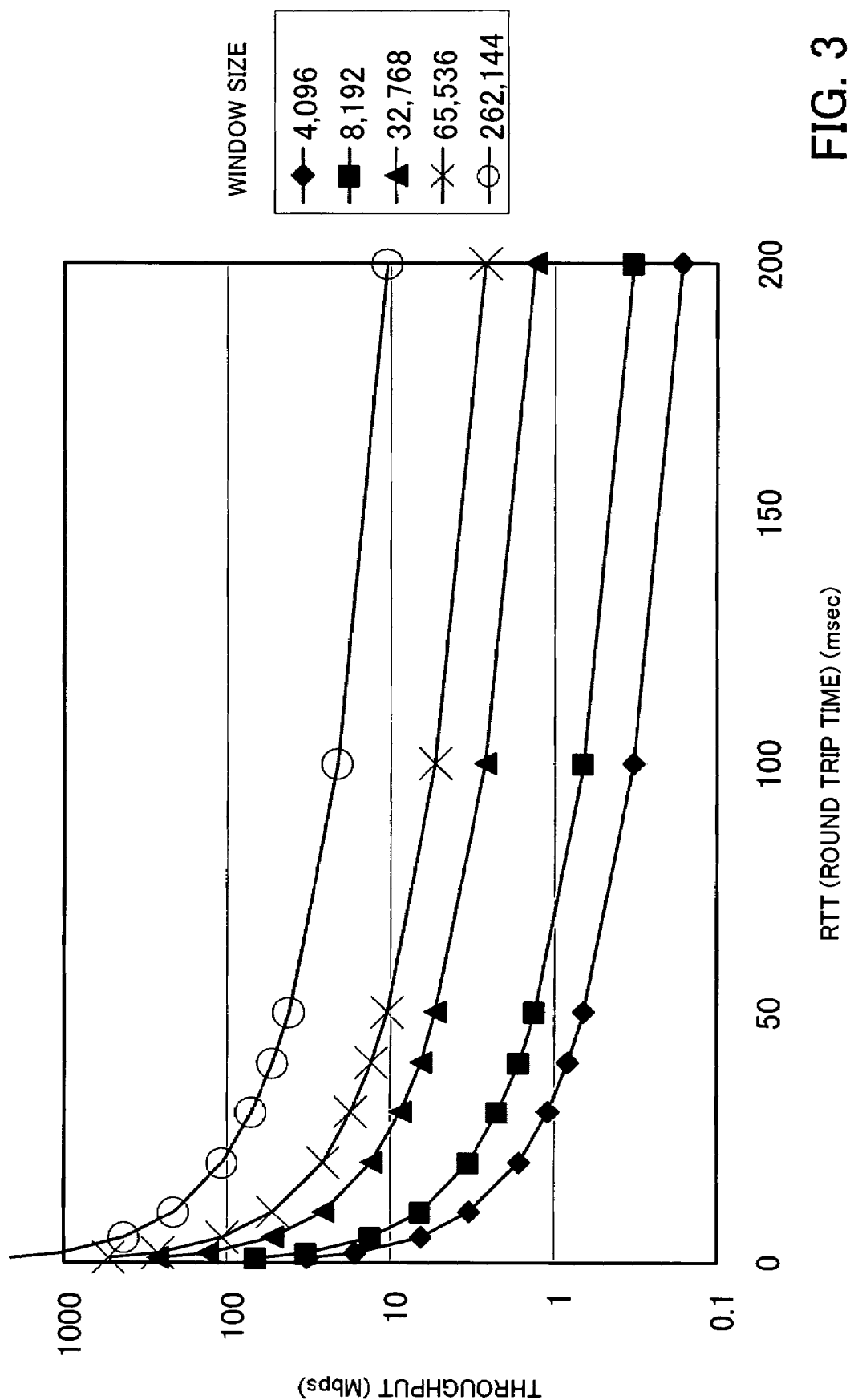
FIG. 3 shows a typical relationship between TCP throughput and RTT.

FIG. 3 shows a typical relationship between TCP throughput and RTT observed with respect to a plurality of window sizes, wherein the vertical axis indicates throughput (estimated value) (Mbps) and the horizontal axis indicates RTT (msec). As will be understood from the illustrated relationship, the throughput lowers with increase in the RTT. Also, the larger the window size, the higher the throughput becomes. This is because the window control for transmitting packets while maintaining a constant window size is performed for the purpose of recovery from communication error, but since the RTT is necessary for an acknowledgment response to reach the transmitting side, as shown in FIG. 2, information exceeding the window size cannot be propagated at least within the RTT. Note, however, that the figure shows the upper limit of the throughput in an ideal state, and since in practice the window size dynamically changes due to packet loss (as described in detail later), the actual throughput is lower than the value shown in the figure.

The analysis result presentation unit S5 displays the estimated value of the throughput, obtained by the throughput estimate calculation unit S4, and an actual measured value of the throughput (which can be calculated from the amount of information of the outgoing and incoming packets captured by the packet capture unit S1 within a fixed time), together with various other communication parameters including the window size and the RTT, on a display 10a to be presented to the user.

The operation of the fault analysis device 10 can be summarized as follows:

When the communication application 11 is executed, the packet capture unit S1 captures outgoing and incoming packets and the round trip time measurement unit S2 measures the RTT. Also, the communication window size estimation unit S3 estimates the window size of the server 20 on the basis of the captured incoming packets. Using the smaller one of the window size of the fault analysis device 10 and the window size of the server 20 estimated by the communication window size estimation unit S3, the throughput estimate calculation unit S4 calculates an estimated value of the throughput according to the equation: Throughput estimate=window size/RTT. After the throughput estimate is obtained, the analysis result presentation unit S5 displays the estimated value and actual measured value of the throughput, together with various other communication parameters including the window size and the RTT, on the display 10a to present the analysis results to the user.

In this manner, the estimated value and actual measured value of the throughput are quantitatively presented for comparison, together with various other communication parameters including the window size and the RTT, and thus even in the case where the throughput lowers due to a cause other than packet loss, such a cause can be prevented from being overlooked.

The present invention will be now described in detail.

Figure 4:
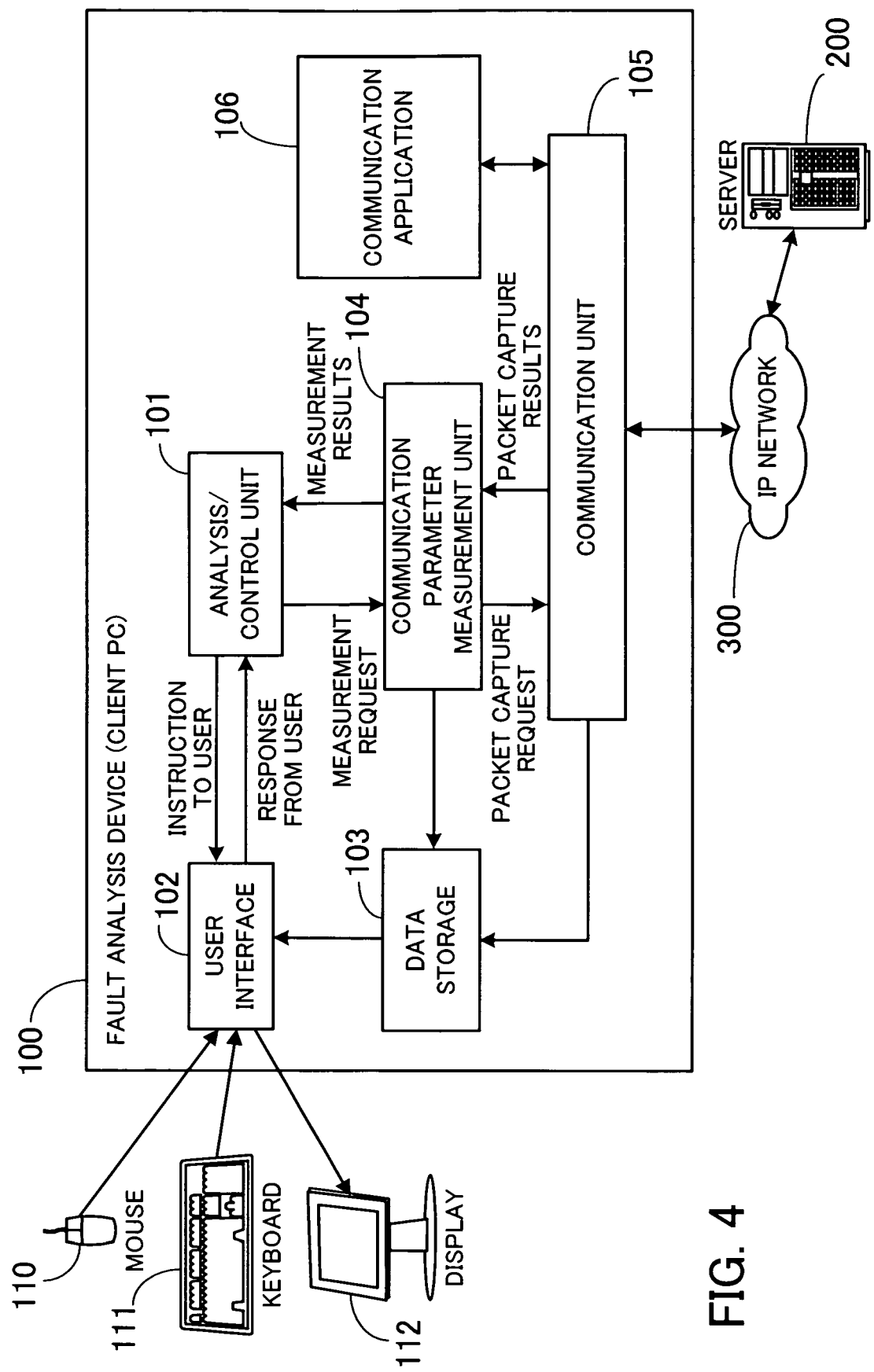
FIG. 4 shows an exemplary configuration of the fault analysis device.

FIG. 4 shows an exemplary configuration of the fault analysis device.

In TCP/IP communication, it is necessary that packets be captured and analyzed at an end point (protocol end point) of a client system or server system where the throughput is greatly influenced. Accordingly, the figure illustrates the case where a client PC capable of Web access is made to function as a fault analysis device 100.

The fault analysis device 100 has an analysis/control unit 101, a user interface 102, a data storage 103, a communication parameter measurement unit 104, a communication unit 105, and a communication application 106.

The analysis/control unit 101 controls various analyses illustrated in FIG. 1, such as the calculation of a throughput estimate and the compensation for the influence of packet loss, and also controls the individual parts of the fault analysis device 100. The analysis/control unit 101 is, for example, a CPU (Central Processing Unit).

The user interface 102 has the function of receiving responses from the user, input through a mouse 110 and a keyboard 111, and notifying the analysis/control unit 101 of the user's responses. Also, the user interface 102 has the function of processing instructions to the user (including the performance fault analysis results etc.), generated by the analysis/control unit 101, in accordance with GUI (Graphical User Interface) etc., and displaying the instructions on a display 112 to be presented to the user.

The data storage 103 stores packet information and data such as communication parameters. The data storage 103 is, for example, a hard disk drive (HDD) or a RAM (Random Access Memory).

The communication parameter measurement unit 104 measures communication parameters such as a packet loss rate, RTT and window size, under the control of the analysis/control unit 101. The measurement unit 104 also obtains an actual measured value of the throughput.

The communication unit 105 establishes a connection with an IP network 300 such as the Internet or an IP-VPN (Internet Protocol-Virtual Private Network). Also, under the control of the analysis/control unit 101, the communication unit 105 captures outgoing and incoming packets during execution of the communication application 106. To enable the communication parameter measurement unit 104 to measure the RTT, a ping (Packet InterNet Groper) command of ICMP (Internet Control Message Protocol), which is an Internet-layer protocol associated with TCP/IP, may be executed. In the case of measuring the RTT during execution of the communication application 106 such as FTP, however, a time nearly equal to the RTT can also be obtained by measuring a response time from the transmission of a TCP acknowledgment request packet (hereinafter "SYN packet") to the reception of an acknowledgment packet (hereinafter "SYNACK packet") responsive thereto.

The communication application 106 such as FTP is stored in the HDD, for example, and is executed under the control of the analysis/control unit 101 as soon as the user's instruction is received.

Operation of the fault analysis device 100 will be now described.

Using the mouse 110 or the keyboard 111, for example, the user enters an instruction to execute a communication application, whereupon the instruction is received by the user interface 102 and transferred to the analysis/control unit 101 and the specified communication application 106 is executed under the control of the analysis/control unit 101. Where the executed communication application 106 is software that communicates with a server 200 through the IP network 300, the communication unit 105 captures, in response to a packet capture request from the communication parameter measurement unit 104, packets transmitted and received during the execution of the communication application 106. Information on the captured packets is stored in the data storage 103 and is also transferred to the communication parameter measurement unit 104 as packet capture results.

The communication parameter measurement unit 104 is responsive to a measurement request from the analysis/control unit 101 to measure various communication parameter values based on the information about the captured packets.

The RTT is obtained by the fault analysis device 100 by measuring a time from the transmission of a SYN packet to the reception of a SYNACK packet which the server 200 returns immediately after receiving the SYN packet, as mentioned above.

The packet loss rate in the receiving or incoming direction is obtained by observing missing sequence numbers of packets, and the packet loss rate in the transmitting or outgoing direction is obtained by observing the number of retransmission packets.

The window size can be acquired from information in the TCP headers of packets transmitted from the fault analysis device 100, which is a client PC. On the other hand, the window size of the server 200 is estimated from the total data amount of incoming packets received over a cumulative arrival time equal to the RTT. Specifically, the packets 51 corresponding to the window size are transmitted at short intervals (e.g., at intervals of 1 msec or less), as shown in FIG. 2, and the RTT is significantly longer than the interval. Accordingly, a packet interval equivalent to the RTT is regarded as delimiting the window size, and the total data amount of packets received until then is regarded as the window size (cf. FIG. 6, explained later).

An actual value of the throughput is measured from the amount of information of the outgoing and incoming packets captured during a fixed time.

The various communication parameters measured as described above are stored in the data storage 103 and also transferred to the analysis/control unit 101 as measurement results. The analysis/control unit 101 then calculates an estimated value of the throughput based on the window size and the RTT. The throughput is restricted by the smaller one of the window size of the fault analysis device 100 and the window size of the server 200. Thus, using the smaller window size, an estimated value of the throughput is calculated according to the equation: Throughput estimate=window size/RTT. Since the window size varies depending on packet loss, however, it needs to be corrected. The following describes correction methods for compensating for the influence of packet loss.

Figures 5A, 5B:
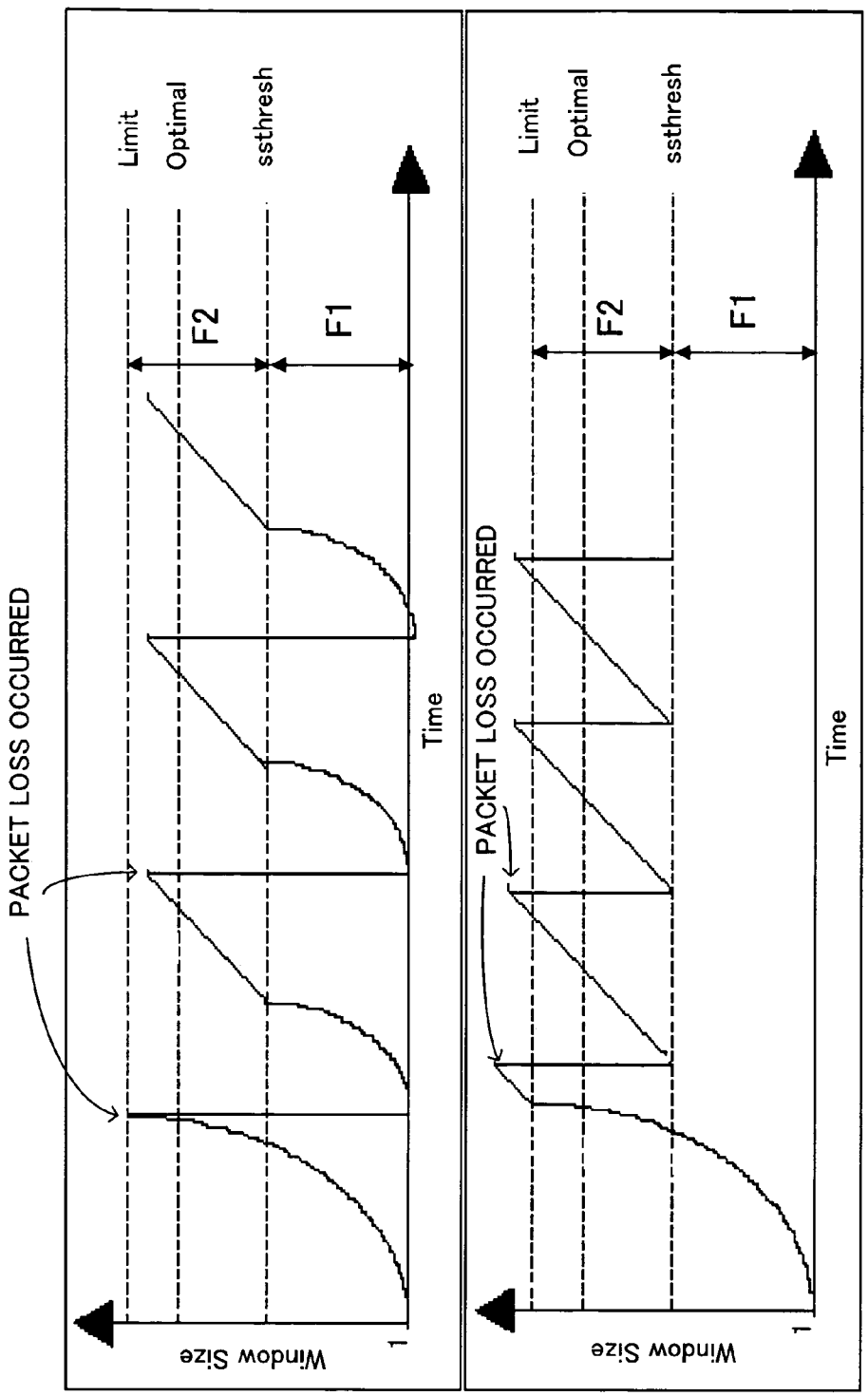

According to TCP, control (hereinafter the "window control") is performed in such a manner that the window size is decreased when packet loss is detected, and is increased when there is no packet loss and thus it is judged that the IP network 300 is not congested, thereby varying the transfer rate. Details of the window control are explained in "'Detailed Explanation of TCP' by Nishida (available on line), Internet Week 99 Pacifico Yokohama, Dec. 14, 1999 (search performed on Jun. 17, 2004), Internet URL: <http://www.nic.ad.jp/ja/materials/iw/1999/notes/C3.PDF>". Algorithm for controlling the window size includes the following two representative algorithms:

FIGS. 5A and 5B exemplify the two window size control algorithms, wherein FIG. 5A shows the Tahoe algorithm and FIG. 5B shows the Reno/New-Reno algorithm.

In both figures, the vertical axis indicates window size and the horizontal axis indicates time. The window size is controlled in two separate phases, namely, a slow start phase F1 and a congestion avoidance phase F2, and the increase rate differs from one communication phase to the other. Specifically, in the slow start phase F1, the window size exponentially increases each time a SYNACK packet is received, whereas in the congestion avoidance phase F2, the window size linearly increases each time a SYNACK packet is received. According to the Tahoe algorithm shown in FIG. 5A, when the occurrence of packet loss is detected, the window size is decreased to "1". On the other hand, according to the Reno/New-Reno algorithm shown in FIG. 5B, when the occurrence of packet loss is detected, the window size is reduced to ½ of the immediately preceding size.

Taking account of the influence of packet loss on the dynamic window size control, the fault analysis device 100 estimates the window size of the server 200 on the basis of the results of captured incoming packets.

Figure 6:
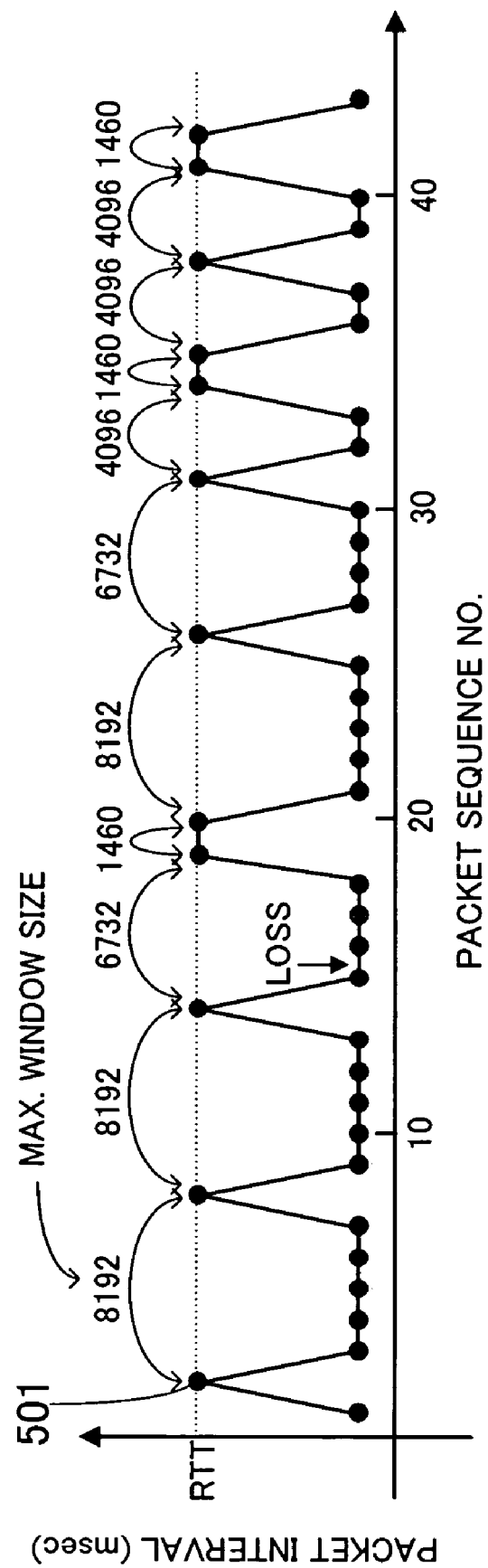
FIG. 6 shows the relationship between incoming packet flow and packet interval.

FIG. 6 shows the relationship between incoming packet flow and packet interval, wherein the vertical axis indicates packet interval (msec) and the horizontal axis indicates packet sequence number.

A packet received after a long interval, for example, a packet received after an interval of 10 msec or more, is estimated to be an Ack wait packet (packet whose interval is nearly equal to the RTT) 501 which is transmitted from the server 200 in response to the arrival of an Ack packet (packet notifying the server 200 of the reception of the packet) from the fault analysis device 100. Then, the sum of data sizes of the packets received between the Ack wait packets is reckoned to be the window size of the server 200. While there is no packet loss, the window size is at a maximum ("8192" bytes as shown in FIG. 6), but if packet loss occurs, the window size decreases as shown in FIGS. 5A and 5B. Thus, an average value of the window sizes as shown in FIG. 6 is taken as an estimated window size that takes account of packet loss. Alternatively, an estimated window size taking account of packet loss may be derived on the basis of the maximum window size estimated from the results of captured incoming packets, as shown in FIG. 6, the loss rate measured by the communication parameter measurement unit 104, and the window size control algorithm as shown in FIGS. 5A and 5B.

A method described below may also be employed to correct the window size taking account of packet loss.

Figure 7:
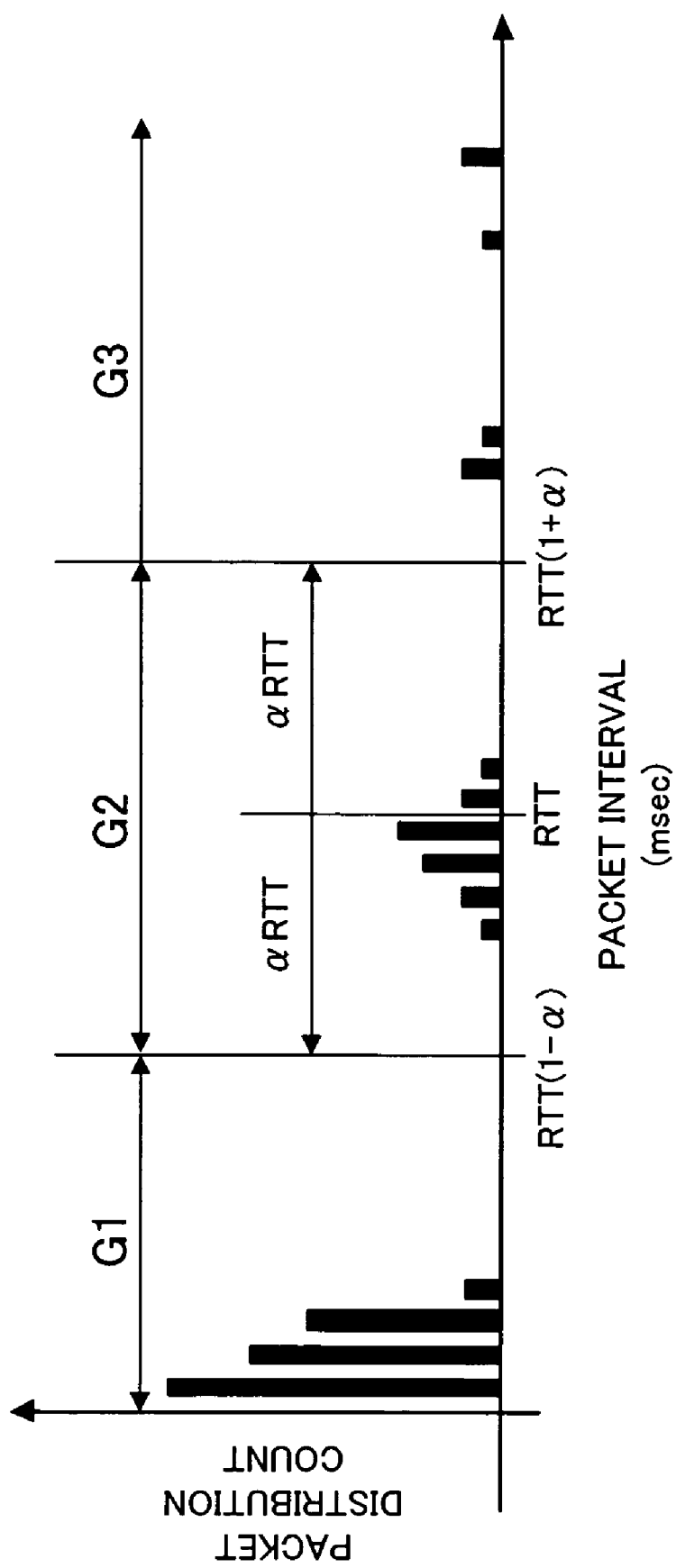
FIG. 7 shows the relationship between incoming packet interval and packet distribution count.

FIG. 7 shows the relationship between incoming packet interval and packet distribution count, wherein the vertical axis indicates packet distribution count and the horizontal axis indicates packet interval (msec).

First, using the measured RTT as a criterion, packets are grouped into three groups G1, G2 and G3 according to packet intervals. The group G1 is a group of packets received at short packet intervals of "0" to RTT(1−α). The group G2 is a group of packets (packets estimated to be Ack wait packets) of which the packet intervals range from RTT(1−α) to RTT(1+α) and are close to the RTT. The group G3 is a group of packets which are received at long packet intervals of over RTT(1+α) due to retransmission delay or the like. The value α is set to about 0.2 to 0.5, for example, taking the dispersion (fluctuation) of packet interval into consideration. The window size can be estimated according to the equation: Window size=average data size per packet/ratio of the group G2 to the total.

In this manner, the analysis/control unit 101 of the fault analysis device 100 can obtain an estimated value of the throughput by using the window size derived taking account of the influence of packet loss.

Figure 8A:
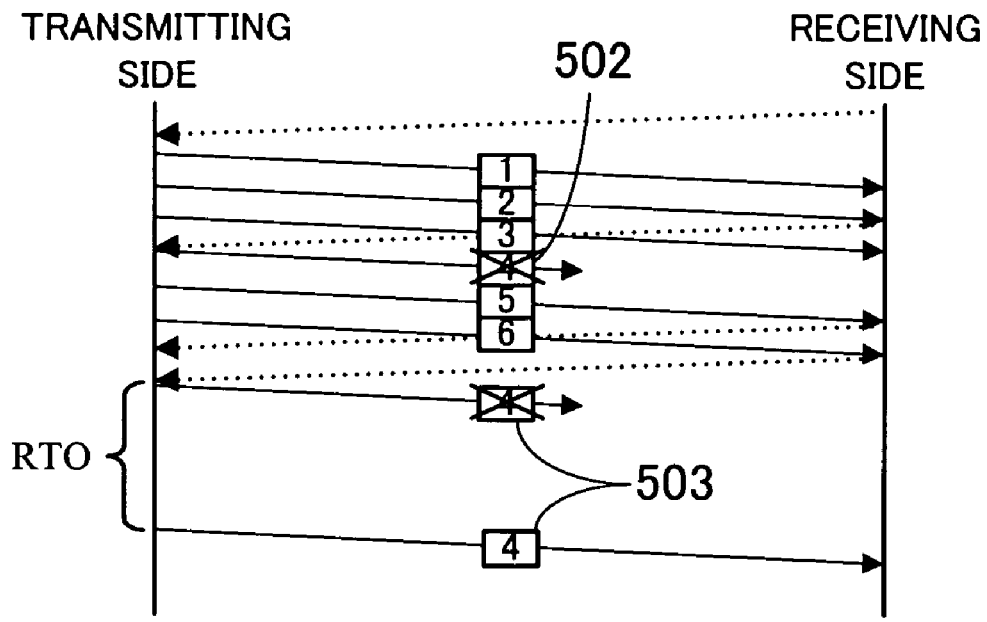
Figure 8B:
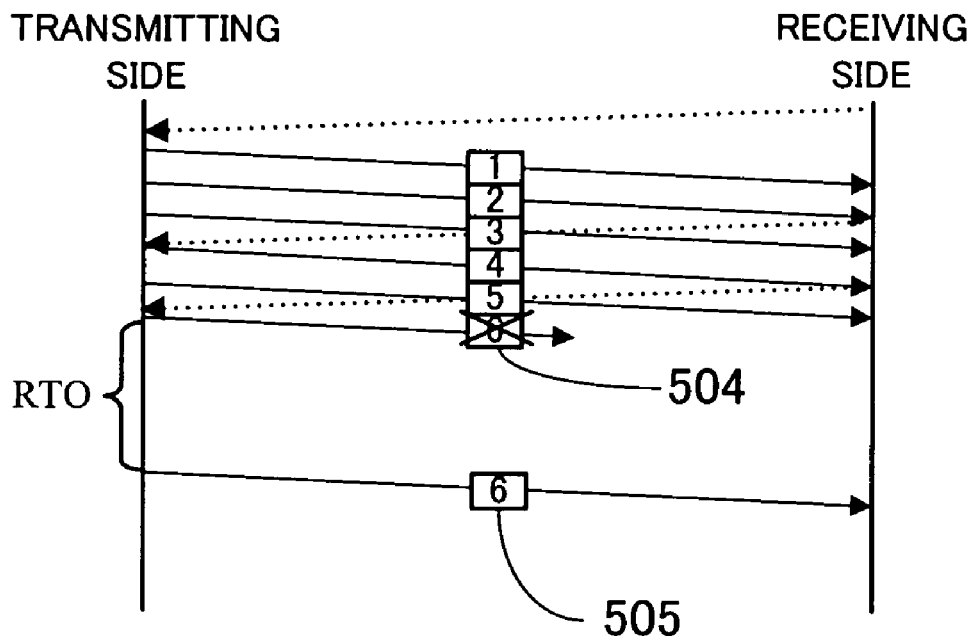

Meanwhile, in some cases, the occurrence of packet loss cannot be detected because of an Ack packet requiring retransmission. In such cases, a retransmission delay time (hereinafter referred to as "RTO (Retransmission Time-Out) waiting time") of about three seconds is usually set during which the packet is not transferred. RTO occurs due to one of the following two causes:

FIGS. 8A and 8B exemplify the occurrence of RTO due to packet loss, wherein FIG. 8A illustrates the case where a retransmission packet is lost again and FIG. 8B illustrates the case where the last packet of data in the window size is lost.

If a packet 502 with the number "4", for example, is lost as shown in FIG. 8A, the transmitting side again transmits a retransmission packet 503 with the number "4" on receiving a packet loss notification from the receiving side. However, if this packet is lost again, the transmitting side again transmits the retransmission packet 503 after a lapse of the RTO waiting time. The number of such lost packets 502 can be estimated by the following equation:

$$\text{Estimated number of lost packets} = \text{data size/average segment size} \times (\text{loss rate})2 \quad (1)$$

where the data size is the total data size of incoming packets, and the average segment size is an average data size per packet. For the loss rate, the aforementioned loss rate measured by the communication parameter measurement unit 104 is used.

On the other hand, if the last packet 504 of data in the window size is lost as shown in FIG. 8B, the transmitting side again transmits a retransmission packet 505 after a lapse of the RTO waiting time. The number of such retransmission packets 505 can be estimated by the following equation:

$$\text{Estimated number of retransmission packets} = \text{data size/average segment size} \times \text{average segment size/estimated window size} \times \text{loss rate} \quad (2)$$

For the estimated window size in the equation, the aforementioned estimated window size explained with reference to FIGS. 6 and 7 is used.

Taking account of the above two cases, the analysis/control unit 101 of the fault analysis device 100 calculates an estimated value of the throughput.

The estimated value of the throughput is given by the following equation:

$$\text{Throughput estimate} = \text{data size/(sum total of RTT delays} + \text{sum total of RTO delays)} \quad (3)$$

where the sum total of RTT delays is given by: Number of packets whose packet intervals are close to RTT×RTT. Packets whose packet intervals are close to the RTT correspond to the packets 501 in FIG. 6 and the packets belonging to the group G2 in FIG. 7 and are given by: Data size/estimated window size.

The sum total of RTO delays in Equation (3) is calculated according to the equation: Number of packets which cause RTO delay as explained with reference to FIGS. 8A and 8B×average RTO delay time. The number of packets which cause RTO delay is given by the sum of the results of the above Equations (1) and (2). The average RTO delay time may be derived from: RTT×loss rate×β, for example, where β is a value obtained by rule of thumb.

Thus, the analysis/control unit 101 of the fault analysis device 100 can calculate an estimated value of the throughput while compensating for the influence of packet loss.

Lastly, under the control of the analysis/control unit 101, the user interface 102 displays the estimated value and actual measured value of the throughput, together with various other communication parameters such as the loss rate, window size and RTT, on the display 112 as fault analysis results to be presented to the user.

Figure 9:
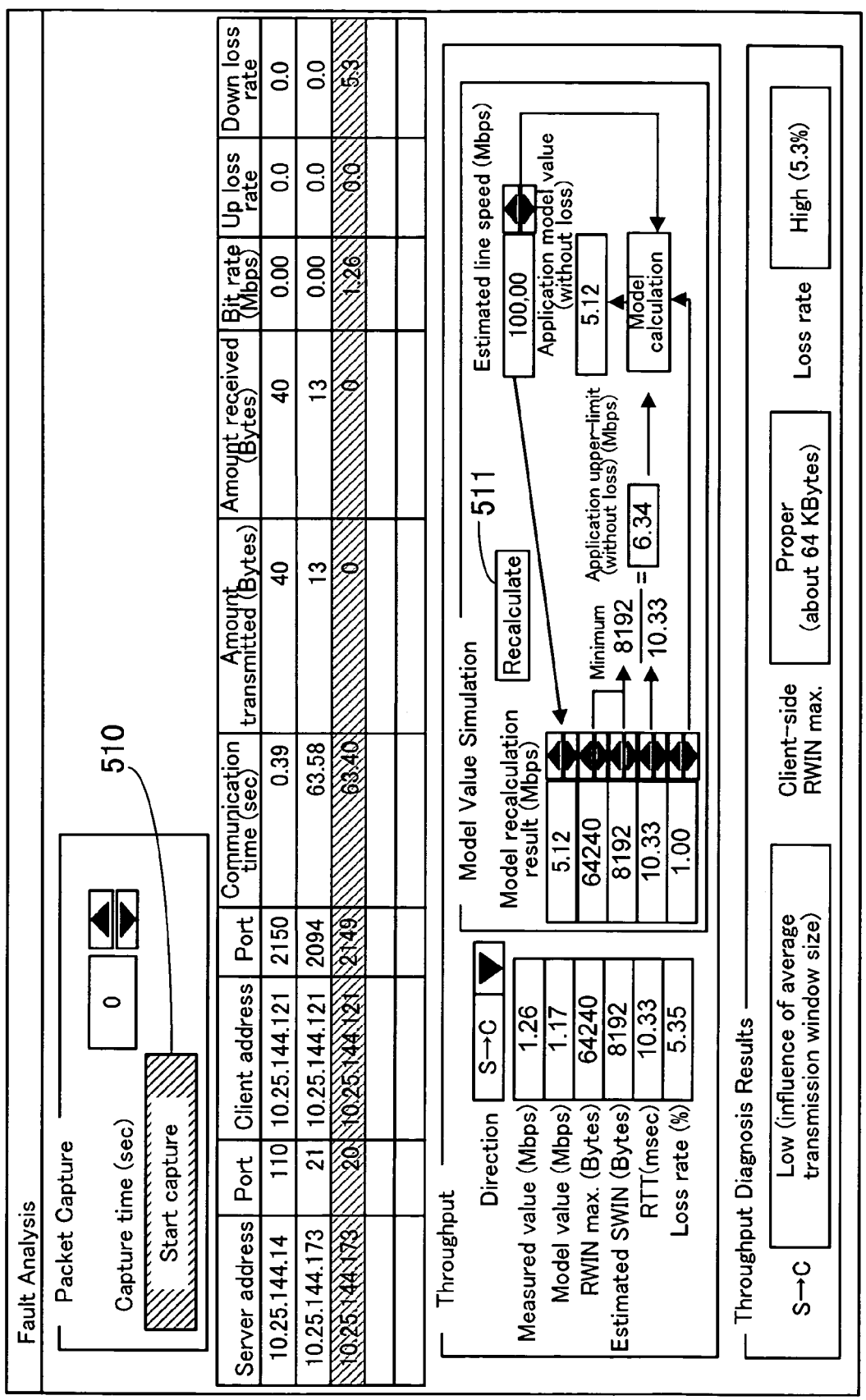
FIG. 9 exemplifies a fault analysis screen.

FIG. 9 exemplifies a fault analysis screen.

The fault analysis screen includes a capture start button 510 for starting the capture of packets. While a certain communication application 106 is under execution, the user specifies the capture time etc. and selects the capture start button 510 on the screen by using the mouse 110 or the like, whereby the fault analysis process can be started. The analysis results are obtained for each target of communication. The example shown in FIG. 9 indicates that the port "20" of the server 200 with the server address "10.25.144.173" and the port "2149" of the client PC (fault analysis device) 100 with the client address "10.25.144.121" have been selected. The analysis results are retrieved from the data storage 103 and displayed. For example, as the communication parameter measurement results, the following are displayed: Communication time, amount of transmitted data, amount of received data, bit rate, up loss rate of data transmission from the client PC 100 to the server 200, and down loss rate of data transmission from the server 200 to the client PC 100.

Also, the estimated value (in FIG. 9, "model value") and actual measured value of the throughput, calculated by the aforementioned process of the analysis/control unit 101, are displayed together with the window size (in the figure, "RWIN maximum (max.)") of the client PC 100 obtained from the TCP header information, the estimated window size (in the figure, "estimated SWIN") of the server 200, the RTT, and the loss rate. In the illustrated example, the throughput of data transmission from the server 200 to the client PC 100 is measured, but the throughput of data transmission in the opposite direction can also be measured. Further, as shown in FIG. 9, the analysis results may be displayed as throughput diagnosis results. The illustrated diagnosis results show that the throughput of data transmission from the server 200 to the client PC 100 is low, that the low throughput is caused by small average transmission window size (estimated SWIN), that the RWIN maximum of the client side is proper, and that the loss rate is as high as 5.3%.

As seen from FIG. 9, the model value may be simulated with communication parameters varied. After communication parameters are entered, a recalculation button 511 is depressed, whereupon the model value is recalculated and displayed under the control of the analysis/control unit 101. Also, an estimated transmission line speed may be entered so that the model value may be restricted to the estimated line speed if the former exceeds the latter. This permits the user not only to learn the measurement results but to infer how much the throughput can be increased by improving the packet loss rate etc., thus assisting the user to make plans for the recovery from performance fault.

As described above, the estimated value and actual measured value of the throughput are presented for comparison, whereby the user can ascertain whether the actual system is operating normally in accordance with the communication protocol and whether a fault in performance has occurred or not. Namely, the throughput is low if the packet loss is great, and since the throughput can be quantitatively estimated, it is possible to quantitatively appraise the cause-effect relation. In conventional devices, the results of measurement of packet loss etc. are checked against absolute yardsticks (e.g., if the loss rate is 1% or more, it is judged that there is some fault). In this case, however, the cause of performance fault is overlooked if the throughput is low due to a cause other than packet loss. According to the present invention, the actual measured value and estimated value of the throughput are quantitatively compared, thereby diminishing the possibilities of the cause being overlooked.

The processes described above can be performed by a computer. In this case, a program is prepared in which are described the processes for performing the functions of the fault analysis device 100. The program is executed by a computer, whereupon the aforementioned processing functions are accomplished by the computer. The program describing the required processes may be recorded on a computer-readable recording medium. The computer-readable recording medium includes a magnetic recording device, an optical disc, a magneto-optical recording medium, a semiconductor memory, etc. The magnetic recording device may be a hard disk drive (HDD), a flexible disk (FD), a magnetic tape or the like. As the optical disc, a DVD (Digital Versatile Disc), a DVD-RAM, a CD-ROM, a CD-R (Recordable)/RW (ReWritable) or the like may be used. The magneto-optical recording medium includes an MO (Magneto-Optical disk) etc.

To market the program, portable recording media, such as DVDs and CD-ROMs, on which the program is recorded may be put on sale. Alternatively, the program may be stored in the storage device of a server computer and may be transferred from the server computer to other computers through a network.

A computer which is to execute the program stores in its storage device the program recorded on a portable recording medium or transferred from the server computer when a performance fault has occurred or at a suitable time, for example. Then, the computer loads the program from its storage device and performs processes in accordance with the program. The computer may load the program directly from the portable recording medium to perform processes in accordance with the program. Also, as the program is transferred from the server computer, the computer may sequentially perform processes in accordance with the received program.

While the preferred embodiments of the present invention have been described, it is to be noted that the present invention is not limited to the foregoing embodiments and may be modified in various ways without departing from the scope of the invention in the appended claims.

According to the present invention, outgoing and incoming packets are captured during the execution of a communication application, to measure the round trip time, and the communication window size of the transmitting source is estimated based on the captured incoming packets. Then, an estimated value of the throughput is calculated from the communication window size and the round trip time, and the estimated value and actual measured value of the throughput are presented together with various other communication parameters including the communication window size and the round trip time. Accordingly, the cause of a performance fault can be accurately located based on quantitative analysis even at the very end point of a client system, server system, etc.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer-readable medium having stored thereon a program for causing a computer to analyze a cause of a performance fault occurring on a network, the computer-readable medium having the program stored thereon comprising:

packet capture means for capturing outgoing and incoming packets during execution of a communication application;

round trip time measurement means for measuring a round trip time;

communication window size estimation means for estimating a communication window size of a transmitting source based on the captured incoming packets;

throughput estimate calculation means for calculating an estimated value of throughput based on the communication window size and the round trip time; and analysis result presentation means for presenting the estimated value and actual measured value of the throughput, together with communication parameters including the communication window size and the round trip time, wherein said communication window size estimation means estimates the communication window size from a total data amount of the incoming packets received over a cumulative arrival time equal to the round trip time.

2. The computer-readable medium according to claim 1, wherein said throughput estimate calculation means calculates an estimate value of the throughput while compensating for an influence of packet loss.

3. The computer-readable medium according to claim 1, wherein the communication window size is estimated from a ratio of incoming packets whose packet intervals are near the round trip time to the captured incoming packets and an average data size per packet.

4. The computer-readable medium according to claim 1, wherein round trip delays in the round trip time and retransmission delays attributable to packet loss are estimated, and the estimated value of the throughput is calculated from a sum total of the round trip delays and a sum total of the retransmission delays.

5. The computer-readable medium according to claim 4, wherein the sum total of the retransmission delays is a time obtained by multiplying a sum of first and second values by an average retransmission delay time, where the first value is an estimated number of retransmission packets possibly lost during communication, the first value being proportional to the square of a packet loss rate, and the second value is an estimated number of last incoming packets which are possibly lost among data in the communication window size, the second value being proportional to the packet loss rate.

6. The computer-readable medium according to claim 1, wherein the estimated value of the throughput is recalculated with a measured one of the communication parameters varied.

7. A fault analysis device for analyzing a cause of a performance fault occurring on a network, comprising:

packet capture means for capturing outgoing and incoming packets during execution of a communication application;

round trip time measurement means for measuring a round trip time;

communication window size estimation means for estimating a communication window size of a transmitting source based on the captured incoming packets;

throughput estimate calculation means for calculating an estimated value of throughput based on the communication window size and the round trip time; and analysis result presentation means for presenting the estimated value and actual measured value of the throughput, together with communication parameters including the communication window size and the round trip time, wherein said communication window size estimation means estimates the communication window size from a total data amount of the incoming packets received over a cumulative arrival time equal to the round trip time.

8. A fault analysis method of analyzing a cause of a performance fault occurring on a network, comprising:

a packet capture step of capturing outgoing and incoming packets during execution of a communication application;

a round trip time measurement step of measuring a round trip time;

a communication window size estimation step of estimating a communication window size of a transmitting source based on the captured incoming packets;

a throughput estimate calculation step of calculating an estimated value of throughput based on the communication window size and the round trip time; and an analysis result presentation step of presenting the estimated value and actual measured value of the throughput, together with communication parameters including the communication window size and the round trip time wherein said communication window size estimation step estimates the communication window size from a total data amount of the incoming packets received over a cumulative arrival time equal to the round trip time.

* * * * *